United States Patent
Hirao et al.

(10) Patent No.: US 11,196,313 B2
(45) Date of Patent: Dec. 7, 2021

(54) STATOR MANUFACTURING METHOD

(71) Applicants: TOYOTA JIDOSHA KABUSHIKI KAISHA, Toyota (JP); DENSO CORPORATION, Kariya (JP)

(72) Inventors: Yasuyuki Hirao, Okazaki (JP); Daisuke Mizushima, Toyota (JP); Hiroaki Takeda, Kariya (JP); Sho Yasuda, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 234 days.

(21) Appl. No.: 16/516,678

(22) Filed: Jul. 19, 2019

(65) Prior Publication Data

US 2020/0099266 A1    Mar. 26, 2020

(30) Foreign Application Priority Data

Sep. 20, 2018  (JP) .............................. JP2018-176312

(51) Int. Cl.
| | |
|---|---|
| *H02K 3/12* | (2006.01) |
| *H02K 15/085* | (2006.01) |
| *H02K 15/04* | (2006.01) |
| *H02K 15/00* | (2006.01) |

(52) U.S. Cl.
CPC .......... *H02K 3/12* (2013.01); *H02K 15/0037* (2013.01); *H02K 15/0081* (2013.01); *H02K 15/0421* (2013.01); *H02K 15/085* (2013.01)

(58) Field of Classification Search
CPC .. H02K 3/12; H02K 15/0037; H02K 15/0081; H02K 15/0421; H02K 15/085
See application file for complete search history.

(56) References Cited

U.S. PATENT DOCUMENTS

| | | | | | |
|---|---|---|---|---|---|
| 1,552,384 | A | * | 9/1925 | MacMillan | H02K 3/28 318/820 |
| 1,822,261 | A | * | 9/1931 | Apple | H02K 3/12 310/201 |
| 1,826,295 | A | * | 10/1931 | Apple | H02K 3/12 310/201 |

(Continued)

FOREIGN PATENT DOCUMENTS

| | | | |
|---|---|---|---|
| CN | 105745825 A | | 7/2016 |
| JP | 2001069731 A | * | 3/2001 |
| JP | 2001095186 A | * | 4/2001 |

(Continued)

OTHER PUBLICATIONS

U.S. Appl. No. 16/418,326, Yu Takanezawa, filed May 21, 2019.

*Primary Examiner* — Carl J Arbes
(74) *Attorney, Agent, or Firm* — Sughrue Mion, PLLC

(57) ABSTRACT

Provided is a stator manufacturing method including: inserting a plurality of segment coils into a plurality of slots formed in a stator core; bending arms of the segment coils that protrude from the stator core, in a circumferential direction of the stator core; before or after bending the segment coils in the circumferential direction, directing parallel to each other leading end portions of the segment coils that are adjacent to each other in a radial direction of the stator core; and welding together the leading end portions of the segment coils with the leading end portions directed parallel to each other.

5 Claims, 9 Drawing Sheets

(56) References Cited

U.S. PATENT DOCUMENTS

2016/0294263 A1 10/2016 Hashimoto et al.
2017/0117782 A1 4/2017 Hirao

FOREIGN PATENT DOCUMENTS

| JP | 2016-187269 A | * | 10/2016 |
| JP | 2017-085701 A | | 5/2017 |
| WO | 1992006527 A1 | * | 4/1992 |

* cited by examiner

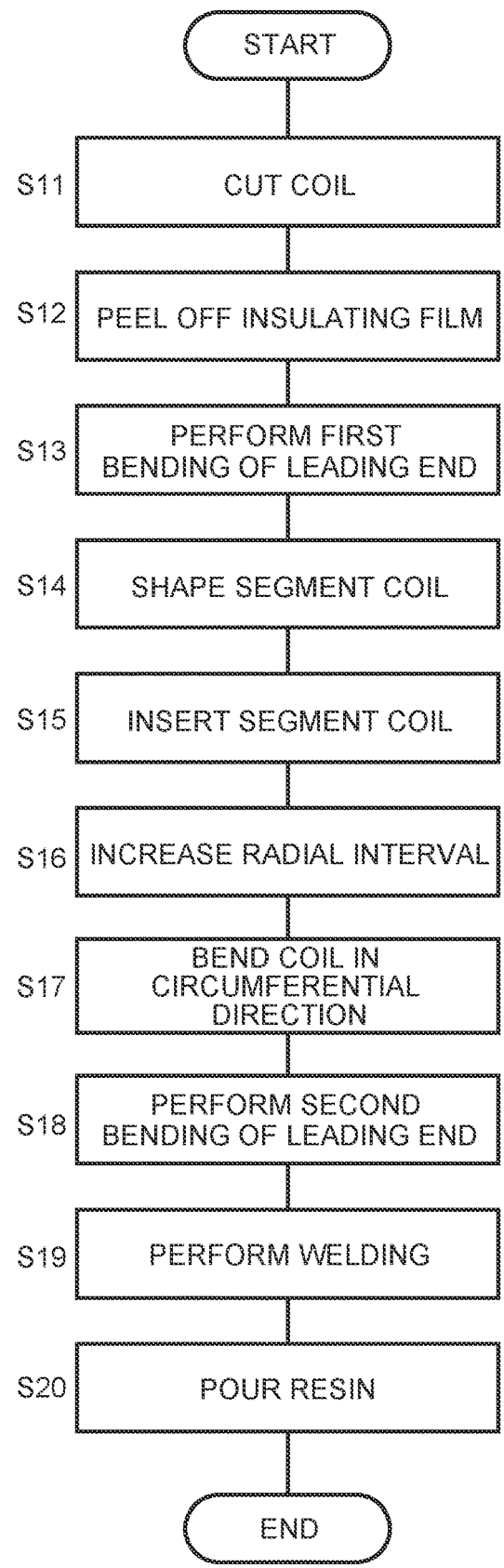

STATOR MANUFACTURING METHOD

INCORPORATION BY REFERENCE

The disclosure of Japanese Patent Application No. 2018-176312 filed on Sep. 20, 2018 including the specification, drawings and abstract is incorporated herein by reference in its entirety.

BACKGROUND

1. Technical Field

The present disclosure relates to a stator manufacturing method in which segment coils are used to form a stator.

2. Description of Related Art

A stator manufacturing method in which single-turn segment coils are used to form a stator coil has been hitherto known. In Japanese Patent Application Publication No. 2017-85701, U-shaped segment coils are each inserted into two of a plurality of slots formed in a stator core, and a pair of arms of each segment coil are tilted in circumferential directions of the stator core so as to cross each other. Thus, leading end portions of the pair of arms of one segment coil are placed adjacent to leading end portions of the arms of another segment coil in a radial direction of the stator core. Then, the leading end portions of two adjacent segment coils are joined together to form a multi-turn stator coil on the stator core.

SUMMARY

If the directions of the adjacent leading end portions are different from each other before the segment coils are joined together, these leading end portions become damaged or bent by hitting each other when pressed against each other, which may result in a poor joint later. For example, when laser welding is performed on the adjacent leading end portions, these portions tend to be inadequately welded together due to a gap left therebetween.

An aspect of the present disclosure relates to a stator manufacturing method including: inserting a plurality of segment coils into a plurality of slots formed in a stator core; bending arms of the segment coils that protrude from the stator core, in a circumferential direction of the stator core; before or after bending the segment coils in the circumferential direction, directing parallel to each other leading end portions of the segment coils that are adjacent to each other in a radial direction of the stator core; and welding together the leading end portions of the segment coils with the leading end portions directed parallel to each other.

After the arms of the segment coils are bent in the circumferential direction of the stator core, the leading end portions of the adjacent segment coils may be directed parallel to each other by grasping the leading end portion of one of the adjacent segment coils and twisting the grasped leading end portion so as to turn around a root portion of the leading end portion.

Before the arms of the segment coils are bent in the circumferential direction of the stator core, the leading end portion of one of the adjacent segment coils may be sandwiched between a pair of positive mold and negative mold that have a bend of a predetermined angle and bent with respect to the root portion at the predetermined angle, and after the arms of the segment coils are tilted in the circumferential direction of the stator core, the leading end portions of the adjacent segment coils may be directed parallel to each other.

Peripheral surfaces of the segment coils may be coated with an insulating film. The insulating films on the leading end portions of the segment coils may be peeled off before the arms of the segment coils are bent in the circumferential directions of the stator core. The root portion may be an end portion of a region coated with the insulating film.

The present disclosure allows for welding of two adjacent leading end portions, with these portions directed parallel to each other. Thus, the leading end portions can be welded together while reliably placed in contact with each other.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart showing a stator manufacturing process;

DETAILED DESCRIPTION OF EMBODIMENTS

An embodiment of the present disclosure will be described below based on the drawings. The embodiment described herein is not intended to limit the present disclosure.

Overall Configuration

Figure 1:
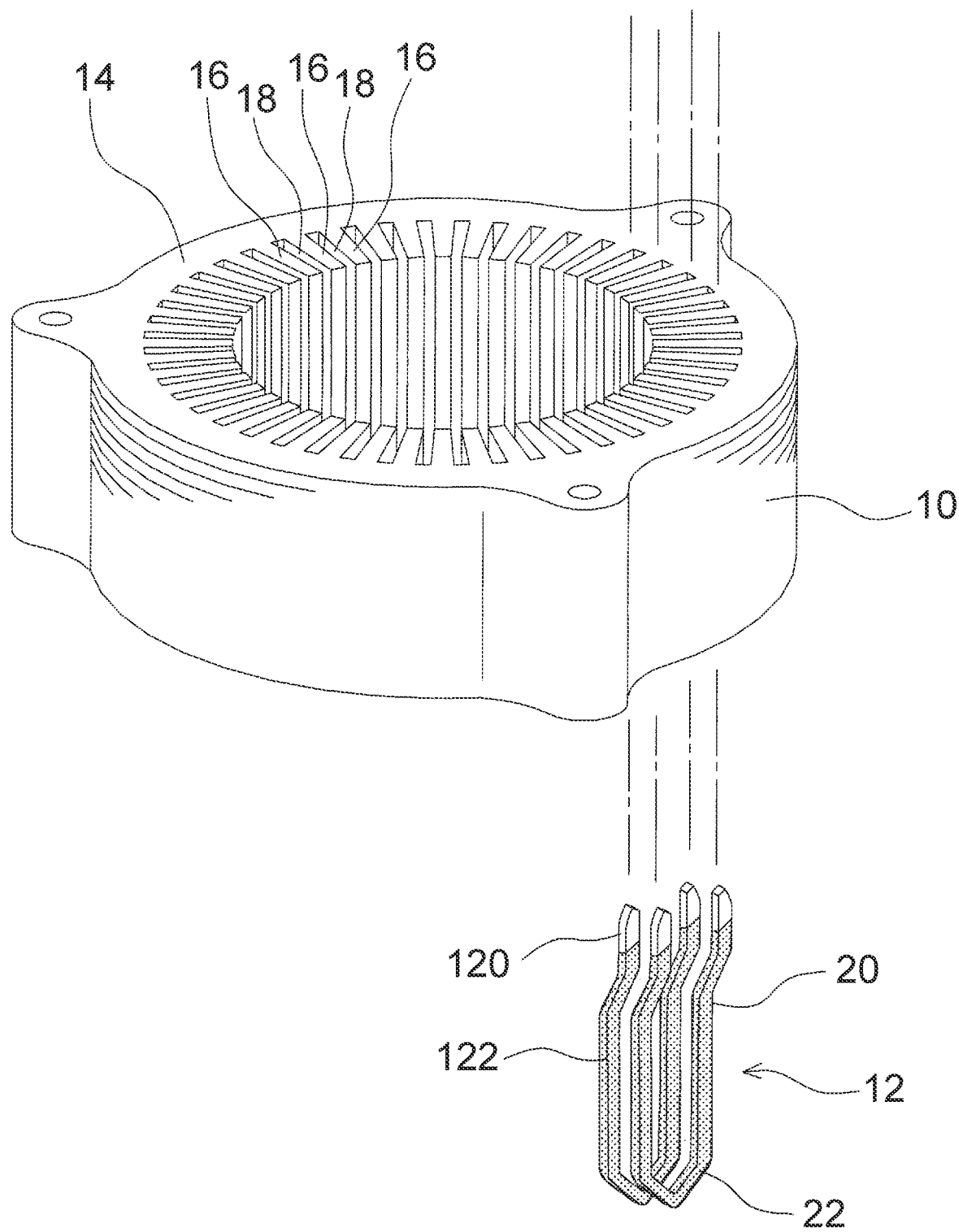
FIG. 1 is a view showing a stator core and segment coils.

FIG. 1 is a view showing a stator core 10 of a rotating electrical machine and segment coils 12 composing a coil. The stator core 10 has a roughly cylindrical shape, and has a substantially cylindrical yoke 14 and teeth 16 extending radially inward from the yoke 14. A direction along a central axis of the cylindrical shape of the stator core 10 will be referred to as an axial direction; a direction orthogonal to the central axis will be referred to as a radial direction; and a direction around the central axis will be referred to as a circumferential direction.

The teeth 16 are arrayed at intervals in the circumferential direction, and a space between adjacent teeth 16 is called a slot 18. The segment coil 12 is a piece of conductive wire (flat conductive wire) which is rectangular in cross-section and on a surface of which an insulating film, such as an enamel layer, is formed. The segment coil 12 is formed by bending the conductive wire into a substantially U-shape. Parts corresponding to straight parts on right and left sides of the letter U will be referred to as arms 20, and a part corresponding to a bottom part connecting these straight parts will be referred to as a bottom 22. The segment coils 12 are inserted into the slots 18 and thereby installed in the stator core 10, with leading ends of the arms 20 protruding from an end surface of the stator core 10 (the end surface on the upper side in FIG. 1).

Figure 2:
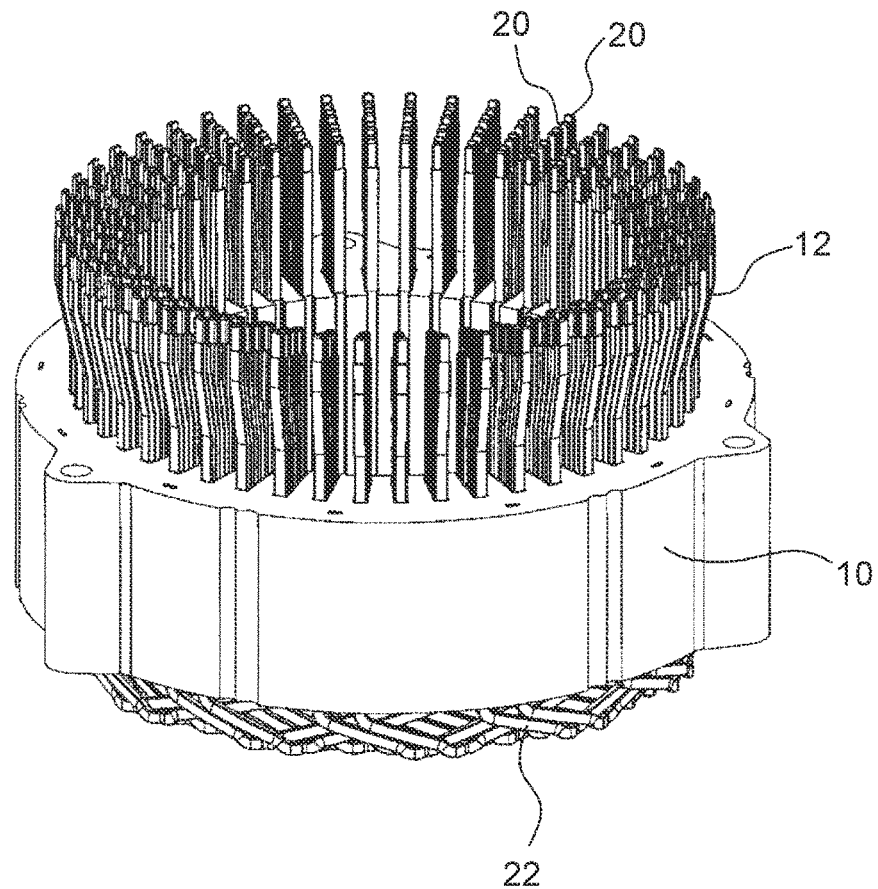
FIG. 2 is a view showing a state of the segment coils having been installed in the stator core.
Figure 3:
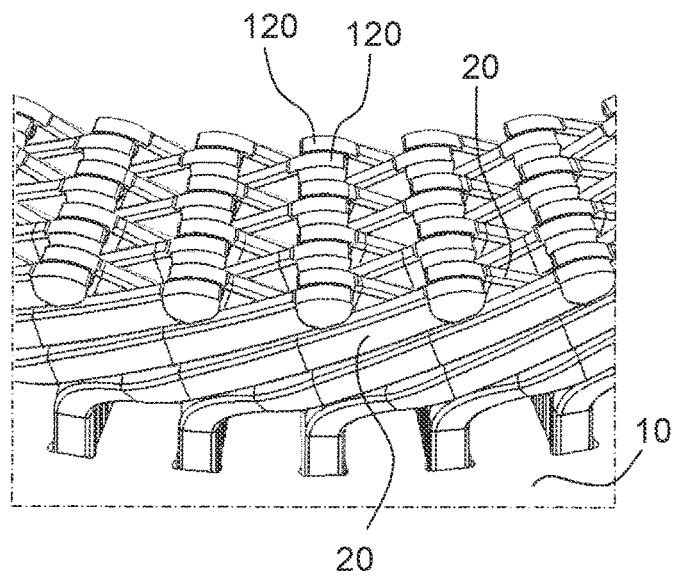
FIG. 3 is a view showing a state of the segment coils after being bent in a circumferential direction and before being welded together at leading ends.

FIG. 2 shows a state of the segment coils 12 having been installed in the stator core. From this state, portions of the arms 20 protruding from the end surface of the stator core 10 are bent in the circumferential direction. Here, the arms 20 of each segment coil 12 cannot be bent at an angle equal to or larger than 90° due to the presence of the segment coils 12 adjacent to that segment coil 12 in the circumferential direction. Therefore, the arms 20 of each segment coil 12 are bent at an angle smaller than 90° in the circumferential direction. FIG. 3 shows a state of the arms 20 having been bent. Leading ends of two arms 20 that are adjacent to each other in the radial direction (e.g., leading end portions 120, 120 of the arms shown in FIG. 3) are welded together, so that the segment coils 12 are connected to one another to form a stator coil. The segment coil 12 is coated with an insulating film 122, such as an enamel layer, and the insulating film 122 has been peeled off and removed from the leading end portion 120.

Figure 4:
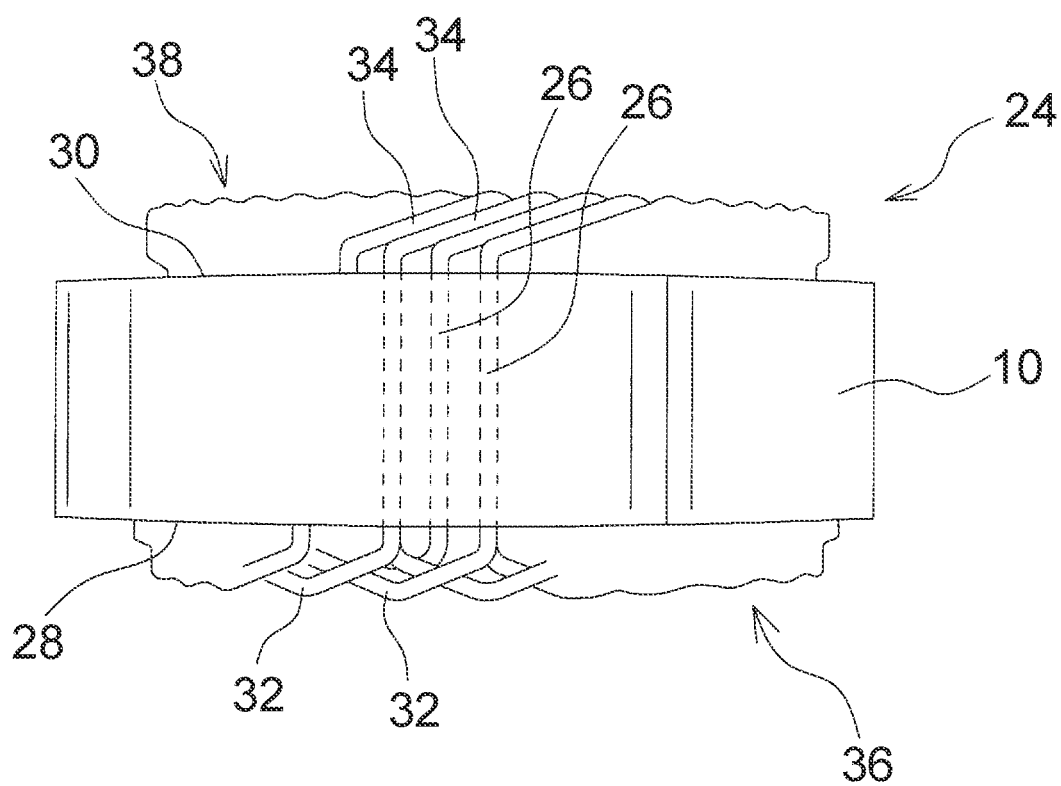
FIG. 4 is a view showing a state of the segment coils having been welded together to form a stator coil.

FIG. 4 shows a state of the segment coils 12 having been welded together to form a stator coil 24. The segment coil 12 has in-slot portions 26 that are disposed inside the slots, and coil end portions 32, 34 that connect the in-slot portions to each other outside end surfaces 28, 30, in the axial direction, of the stator core. On the side of the first end surface 28 that is the lower side in FIG. 4, the bottoms 22 of the segment coils 12 represent the first coil end portions 32, which form a first coil end 36. On the side of the second end surface 30 that is the upper side, the second coil end portions 34 that are portions of the arms 20 of the segment coils 12 protruding from the slots 18 are welded together at leading ends to form a second coil end 38.

Manufacturing Method

FIG. 5 is a flowchart relating to a stator manufacturing method, particularly a stator coil manufacturing method.

First, a long piece of coil wire (flat conductive wire) is cut into pieces of a predetermined length (S11). Next, the insulating films 122 on the leading end portions 120, 120 of each cut piece of coil wire are peeled off (S12). Laser irradiation is commonly used to peel off insulating films.

Those pieces of coil wire from which the insulating films 122 on the leading end portions 120 have been peeled off are bent at leading ends (S13). This first bending of the leading ends in step S13 will be described later.

When the first bending of the leading ends in step S13 is completed, the segment coils 12 are shaped into a substantially U-shape as shown in FIG. 1 (S14).

The segment coils 12 having been shaped into a U-shape are inserted into the stator core 10 (S15). The two arms 20 of each segment coil 12 are inserted into different slots 18, and leading end portions of the arms 20 are protruded from the second end surface 30 of the stator core 10. On the side of the first end surface 28 of the stator core 10, a coil end is formed by the bottoms 22 of the segment coils 12. Inside the slot 18, the arms 20 are arrayed in one row in the radial direction to form a radial row. The arms 20 arrayed in the radial direction extend in the circumferential direction across the slots 18 to form a circumferential row. The arms 20 disposed inside one slot 18 each belong to a different circumferential row. Insulating paper may be inserted into the slot 18 before the segment coils 12 are inserted.

The radial interval between the leading end portions 120 of the arms 20 protruding from the second end surface 30 of the stator core 10 is increased (S16). Since the coil end cannot be shifted toward the center, the arms 20 are bent radially outward. Here, the interval between the arms 20 can be increased by sequentially bending the arms such that the bending angles become larger toward the radially outer side.

The arms 20 protruding from the second end surface 30 of the stator core 10 are bent in the circumferential direction (S17). The arms 20 belonging to the same circumferential row are bent in the same direction. The arms 20 belonging to adjacent circumferential rows are bent in the opposite directions from each other. The arms 20 are bent, two rows at a time, from an outside or an inside.

After the arms 20 have been bent in the circumferential direction in step S17, second bending of the leading ends is performed (S18). The second bending of the leading ends in step S18 will be described later.

In a state where the second bending of the leading ends in step S18 is completed, the adjacent leading end portions 120, 120 directed parallel to each other are welded together (S19). As a result, the segment coils 12 are connected to each other so as to form the stator coil 24 wound around the teeth 16. The stator coil 24 is a coil of distributed winding in which three-phase coils are disposed so as to be shifted from one another in the circumferential direction while overlapping one another. Laser welding using laser irradiation is suitably used as the welding method.

When welding of all parts is completed, resin is poured over the entire coil ends (S20). In addition, varnish is supplied to fix the entire coil to the stator core.

S13: First Bending of Leading End

Figure 6A:
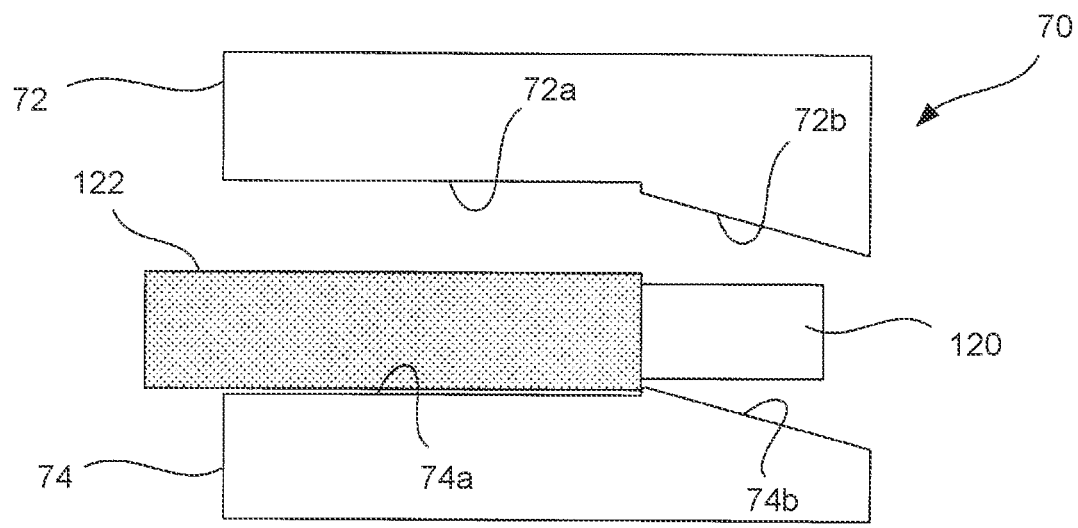
FIG. 6A is a view showing a state before first bending of a leading end is started.
Figure 6B:
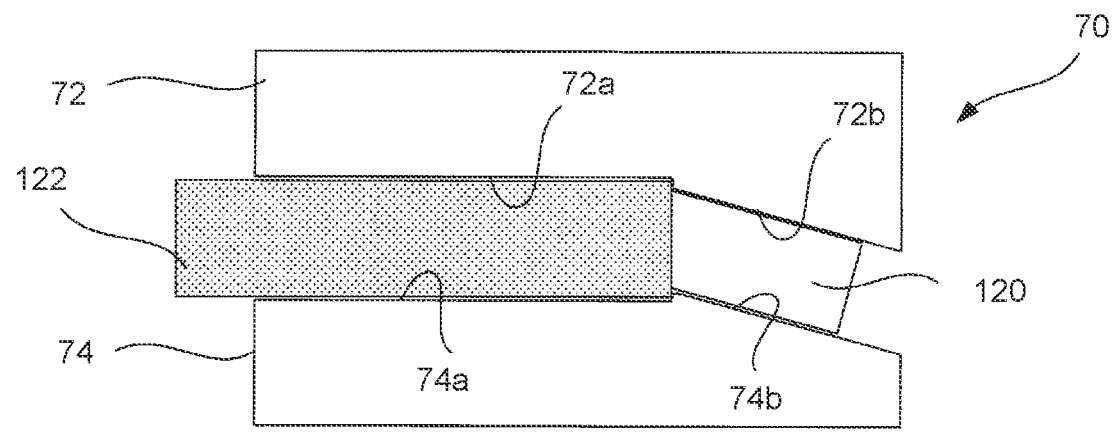
FIG. 6B is a view showing a state of the first bending of the leading end in action.

FIG. 6A and FIG. 6B show the first bending of the leading end in step S13. FIG. 6A shows a state before the bending of the leading end is started, and FIG. 6B shows a state of the bending of the leading end in action. As shown, a mold 70 includes a pair of mold members 72, 74, of which at least one is movable relative to the other. A piece of coil wire (a region coated with the insulating film 122 and the leading end portion 120 from which the insulating film 122 has been peeled off) is sandwiched between these mold members. The mold member 72 has a base part 72a and a leading end part 72b extending from the base part 72a while inclining at a predetermined angle, and the mold member 74 has a base part 74a and a leading end part 74b extending from the base part 74a while inclining at a predetermined angle. Opposite surfaces of the base part 72a and the base part 74a are flat surfaces parallel to each other, and so are opposite surfaces of the leading end part 72b and the leading end part 74b. Accordingly, a space (clearance) defined by the opposite flat surfaces of the mold members 72, 74 has a shape formed by plate-shaped (rectangular parallelepiped) spaces connected to each other at a predetermined bending angle.

As shown in FIG. 6A, in a state where the mold members 72, 74 are separated from each other, a leading end side of the coil wire from which the insulating film has been peeled off is placed between the mold members 72, 74, and the mold members 72, 74 are moved closer to each other, so that the leading end side of the coil wire sandwiched between the mold members 72, 74 is bent relative to a base side of the coil wire.

Thus, the leading end of the coil wire can be bent. The bending angle shown in FIG. 6A and FIG. 6B is exaggerated; in reality, the bending angle is about several degrees (e.g., approximately 2 to 5 degrees).

Since this bending of the leading end is performed at a stage where the segment coil 12 has not yet been inserted into the stator core 10 (has not yet been bent in the circumferential direction), insertion of the coil wire into the mold 70 etc. can be easily performed.

Figure 7A:
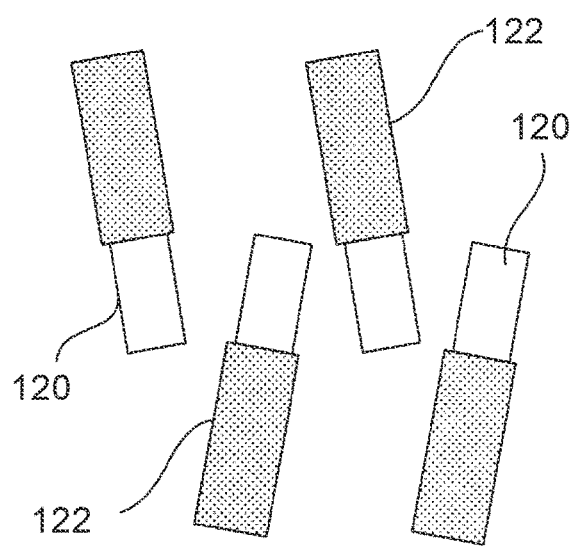
FIG. 7A is a view showing a state of the segment coils having been inserted into the stator core and bent in the circumferential direction, without the leading ends being bent in advance.
Figure 7B:
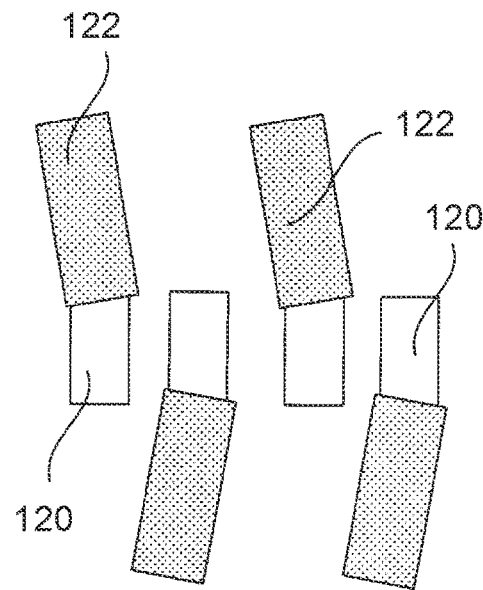
FIG. 7B is a view showing a state of the segment coils having been inserted into the stator core and bent in the circumferential direction, with the leading ends bent in advance.

FIG. 7A and FIG. 7B show a state of the segment coils having been inserted into the stator core 10 and bent in the circumferential direction. FIG. 7A shows a state where the leading ends have not been bent in advance, and FIG. 7B shows a state where the leading ends have been bent in advance. As shown, if the leading ends are bent in advance, the adjacent leading ends are directed parallel to each other when the segment coils are bent in the circumferential direction.

S18: Second Bending of Leading End

When the arms 20 of the segment coils 12 have been bent in the circumferential direction, bending of the leading ends is performed to place parallel to each other the two adjacent leading end portions 120, 120 to be connected to each other. This second bending of the leading ends is performed on the arms 20 that have been bent in the circumferential direction, and therefore the two adjacent leading end portions 120, 120 can be directed correctly parallel to each other. If the accuracy of the first bending of the leading ends is good and the adjacent leading end portions after the arms 20 are bent in the circumferential direction are parallel to each other, the second bending of the leading ends may be omitted. Alternatively, the first bending of the leading ends may be omitted if the leading ends can be adequately bent by the second bending of the leading ends. Further, both the first and second bending of the leading ends may be performed, or the second bending of the leading ends may be performed on those leading ends that need to be corrected after the first bending of the leading ends.

Figure 8A:
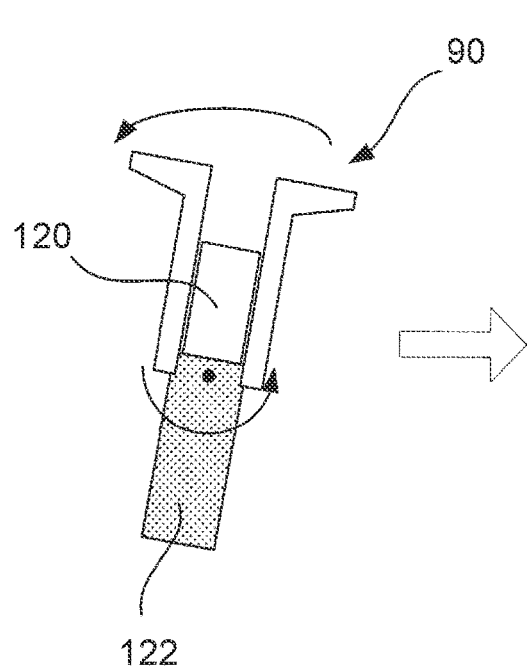
FIG. 8A is a view showing the action of second bending of the leading end of the segment coil, with a leading end portion 120 held by a jig.
Figure 8B:
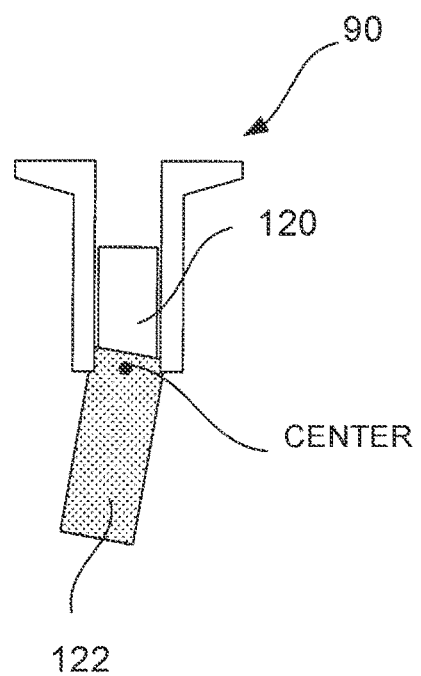
FIG. 8B is a view showing the action of the second bending of the leading end of the segment coil, and showing a state where the second bending of the leading end has been performed.

FIG. 8A and FIG. 8B show the action of the second bending of the leading end. FIG. 8A shows a state where the leading end portion 120 is held by a jig, and FIG. 8B shows a state where the second bending of the leading end has been performed.

As shown, in the second bending of the leading end, the leading end portion 120 of the arm 20 is held by a jig 90, and in this state, the jig 90 is turned around a center located at a point (represented by the dot) near a leading end of the insulating film 122 on the arm 20 to thereby twist the leading end portion 120. Thus, the adjacent leading end portions 120, 120 can be directed parallel to each other. Moreover, an interval between the adjacent leading ends can be maintained by inserting and manipulating the jig 90. For example, an interval of at least about 0.8 mm is maintained.

Figure 9A:
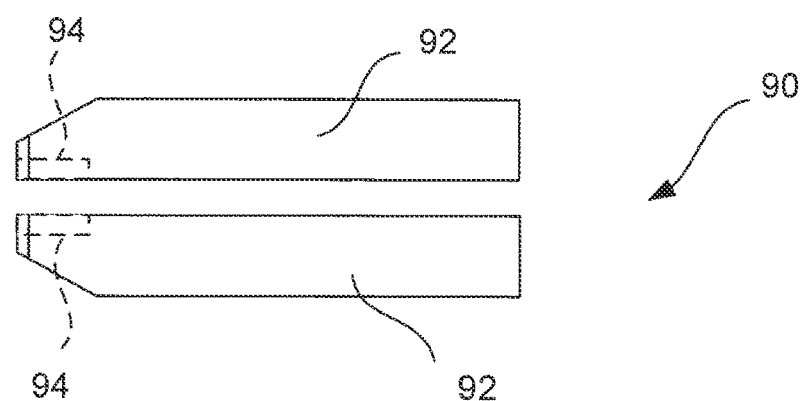
FIG. 9A is a view showing the shape of a jig 90 in a state before grasping.
Figure 9B:
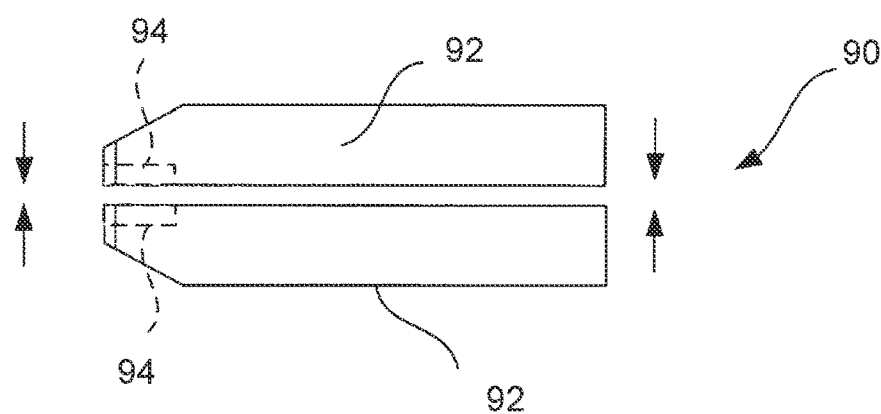
FIG. 9B is a view showing the shape of the jig 90 in a grasping state.
Figure 9C:
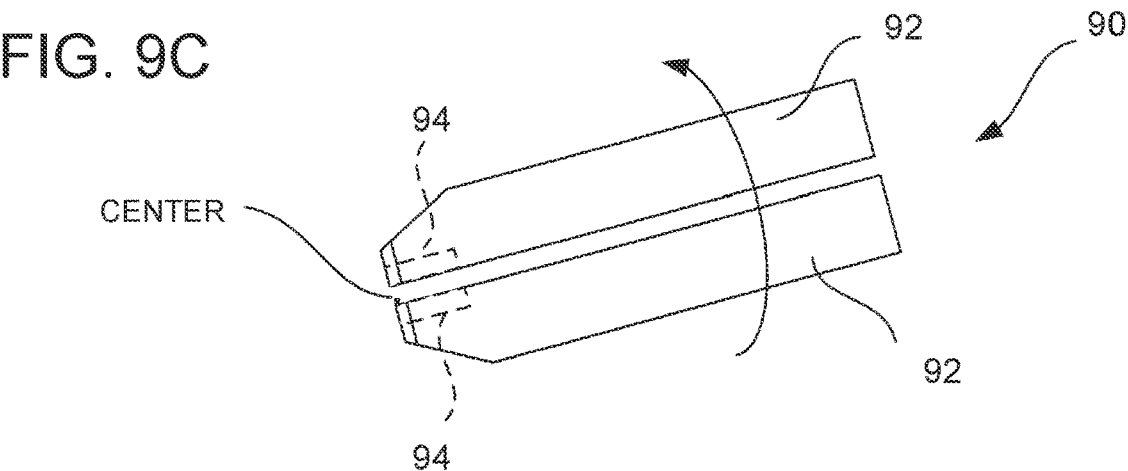
FIG. 9C is a view showing the shape of the jig 90 in a state after twisting.
Figure 9D:
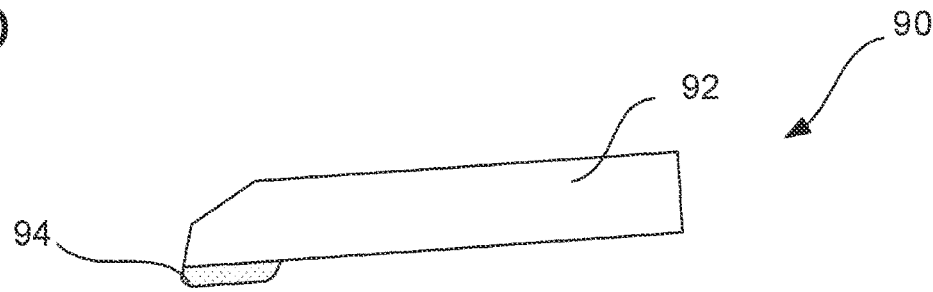
FIG. 9D is a view showing the shape of the jig 90 as seen from a horizontal direction.

FIG. 9A to FIG. 9D show the shape of the jig 90. FIG. 9A shows a state before grasping, FIG. 9B shows a grasping state, FIG. 9C shows a state after twisting, and FIG. 9D shows the shape as seen from a horizontal direction. As shown, the jig 90 includes a pair of manipulation bars 92, 92. Quadrangular plate-shaped grasping portions 94, 94 are provided on lower sides of leading ends of the manipulation bars 92, 92. Thus, as the pair of manipulation bars 92, 92 are moved closer to each other, the grasping portions 94, 94 can grasp the leading end portion of the segment coil 12. Because the grasping portions 94, 94 have a plate shape, the grasping portions 94, 94 can be easily inserted into a clearance between the adjacent segment coils 12. The manipulation bars 92, 92 preferably have high rigidity such that the leading end portion 120 of the segment coil 12 can be reliably grasped. Turning a base side of the manipulation bars 92, 92 around a center located near the leading end of the insulating film 122 of the segment coil 12 can appropriately twist the leading end portion 120 of the segment coil 12.

S19: Welding

Figure 10A:
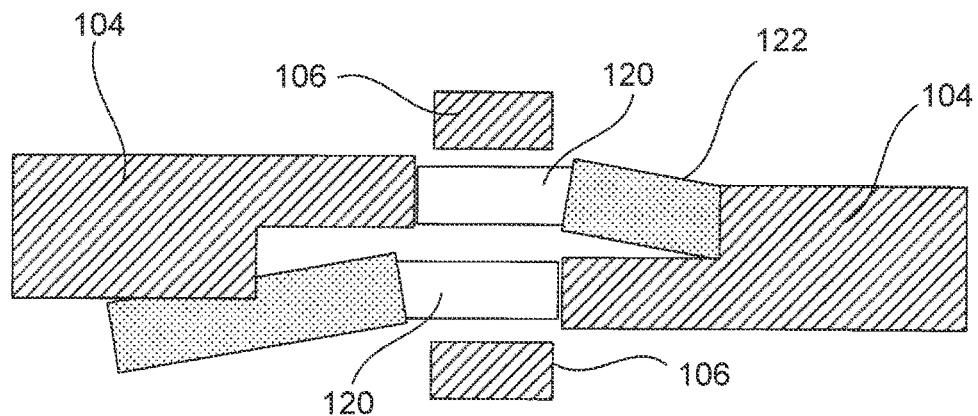
FIG. 10A is a view as seen from an axial direction, showing circumferential and radial clamps in a state where the leading end portions are positioned in the circumferential direction by circumferential clamps 104, 104.
Figure 10B:
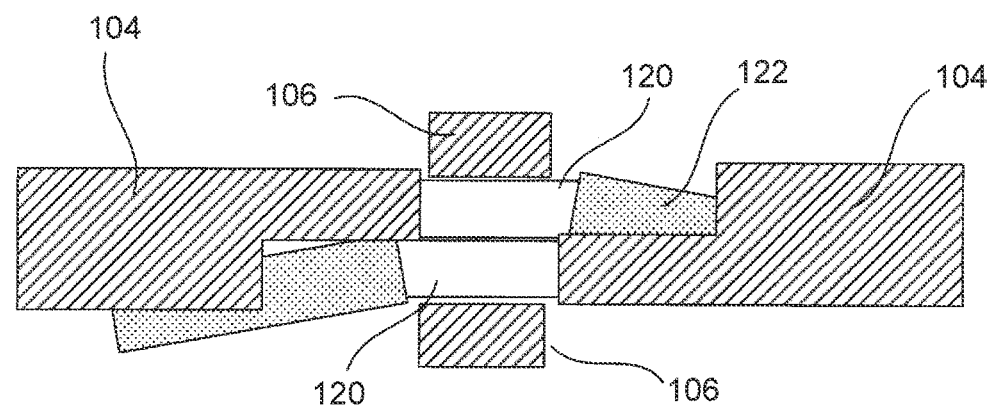
FIG. 10B is a view as seen from the axial direction, showing the circumferential and radial clamps in a state where the two leading end portions 120 are pressed against each other by radial clamps 106.
Figure 10C:
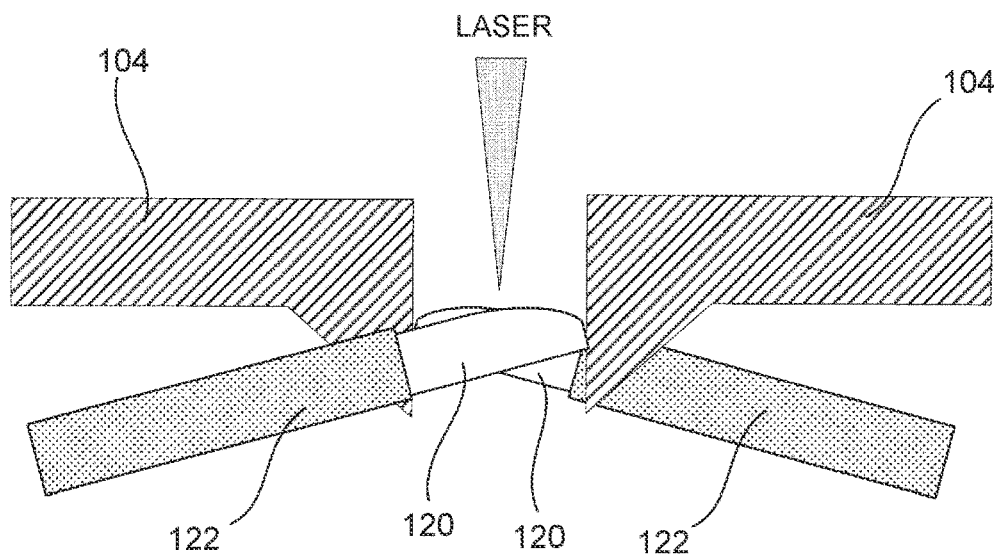
FIG. 10C is a view as seen from a radial direction, showing the circumferential clamps in a state where laser welding is performed.

Here, as shown in FIG. 10A to FIG. 10C, laser welding is performed by using a pair of circumferential clamps 104, 104 and a pair of radial clamps 106, 106. Of FIG. 10A to FIG. 10C, FIG. 10A is a view as seen from the axial direction, showing a state where the leading end portions 120 are positioned in the circumferential direction by the circumferential clamps 104, 104; FIG. 10B is a view as seen from the axial direction, showing a state where the two leading end portions 120 are pressed against each other by the radial clamps 106; and FIG. 10C is a view as seen from the radial direction, showing a state where laser welding is performed.

As shown, the adjacent leading end portions 120, 120 to be welded together are positioned in the circumferential direction by the circumferential clamps 104, 104, and these adjacent leading end portions are pressed against each other by the radial clamps 106, 106. In this state, a contact portion between the leading end portions 120 is irradiated with laser to weld together these portions.

In this embodiment, the directions of the leading end portions 120, 120 to be welded together are adjusted so as to be parallel to each other at a stage before welding. Since the leading end portions 120, 120 are parallel to each other, these portions can be clamped and positioned in the circumferential direction by the circumferential clamps 104, 104 without causing any problem. In particular, in the second bending of the leading ends, two leading end portions are positioned at a predetermined interval. It is therefore unlikely that the leading end portions 120, 120 and the insulating films 122 come into contact with each other during positioning in the circumferential direction by the circumferential clamps 104, 104.

Since the adjacent leading end portions 120, 120 are parallel to each other, the leading end portions 120, 120 can be reliably brought into contact with each other by an appropriate pressing force, without the need for bending the leading end portions 120, 120 when pressing these portions against each other by the radial clamps 106. Thus, the adjacent leading end portions 120, 120 can be appropriately welded together while reliably placed in contact with each other.

Figure 11A:
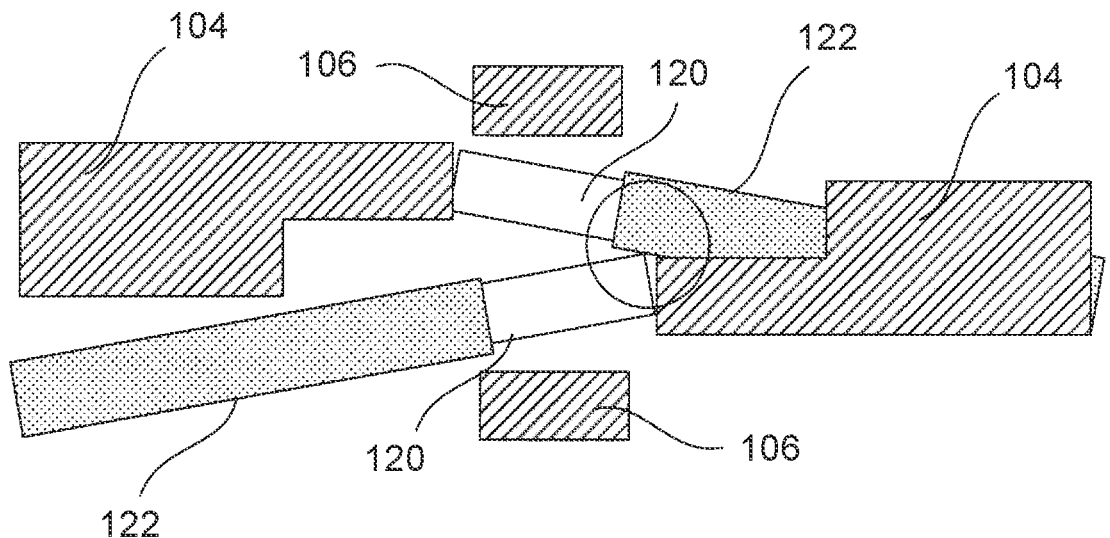
FIG. 11A is a view of a state before clamping, illustrating a case where the leading ends are clamped without being bent in advance.
Figure 11B:
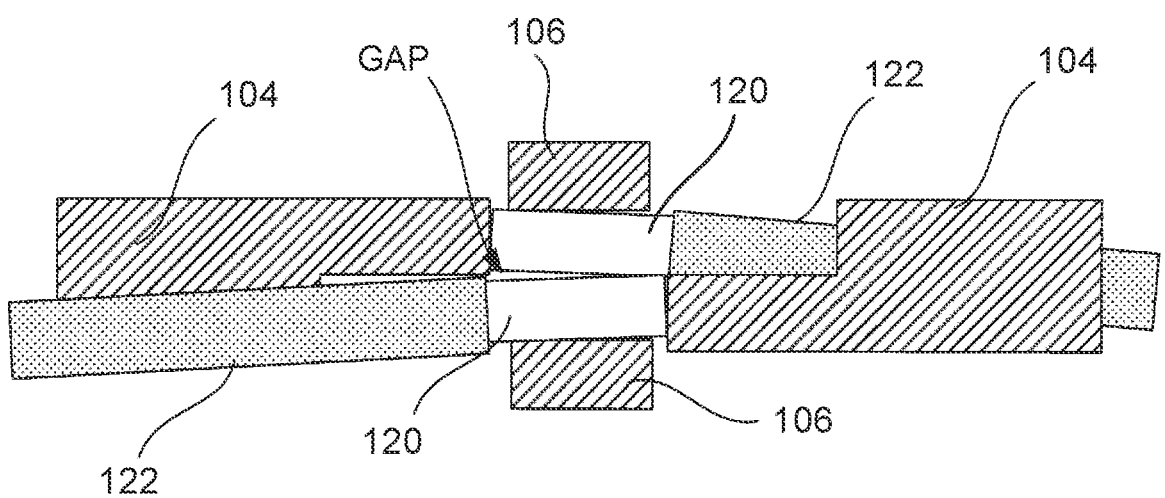
FIG. 11B is a view of a state after clamping, illustrating the case where the leading ends are clamped without being bent in advance.

Here, FIG. 11A and FIG. 11B are views illustrating a case where the leading ends are clamped without being bent in advance. FIG. 11A shows a state before clamping, and FIG. 11B shows a state after clamping. As shown, when the adjacent leading end portions 120, 120 are not bent in advance and therefore not parallel to each other, a gap is left between the leading end portions 120, 120 when these portions are pressed against each other by the radial clamps 106, 106. Welding failure occurs as a result of laser passing through this gap. While such a gap can be eliminated by increasing the radial clamping force, doing so would pressurize a melted portion during welding so as to spill over an upper surface of a weld (upper and lower surfaces in the axial direction), causing welding failure.

Moreover, one leading end of the segment coil 12 may tuck the insulating film of the other leading end when the leading ends are clamped and brought closer to each other from right and left sides by the circumferential clamps 104, 104. Specifically, as indicated by the circle in FIG. 11A, when the leading end portions 120, 120 are positioned in the circumferential direction by the circumferential clamps 104, 104 in a state where the leading end of one leading end portion 120 is in contact with the insulating film 122 of the other leading end portion 120, the insulating film 122 is dragged and tucked by the one leading end portion 120 while this leading end portion is moved in the circumferential direction. In this case, welding failure occurs as laser hits the tucked insulating film during welding and this insulating film burns to generate an explosive gas which forms blowholes.

This embodiment can prevent such a situation.

Effects of Embodiment

The stator manufacturing method according to the embodiment has the step of first bending of leading ends or second bending of leading ends. As a result of this step, the leading end portions 120, 120 of a pair of adjacent segment coils 12 to be welded together are directed parallel to each other before laser welding. Thus, these leading end portions can be clamped without a gap therebetween during welding, and welding failure due to laser passing through a gap can be prevented. Moreover, tucking of the insulating film can be prevented during clamping of the leading end portions 120, 120 in the circumferential direction, so that an adverse effect resulting from the insulating film getting burnt by laser can be prevented.

What is claimed is:

1. A stator manufacturing method comprising:
    inserting a plurality of segment coils into a plurality of slots formed in a stator core;
    bending arms of the segment coils that protrude from the stator core, in a circumferential direction of the stator core;
    before or after bending the segment coils in the circumferential direction, directing parallel to each other leading end portions of the segment coils that are adjacent to each other in a radial direction of the stator core; and
    welding together the leading end portions of the segment coils with the leading end portions directed parallel to each other,
    wherein, after the arms of the segment coils are bent in the circumferential direction of the stator core, the leading end portions of the adjacent segment coils are directed parallel to each other by grasping the leading end portion of one of the adjacent segment coils and twisting the grasped leading end portion so as to turn around a root portion of the leading end portion, and
    wherein the root portion is an end portion of a region coated with the insulating film.

2. The stator manufacturing method according to claim 1, wherein:
    peripheral surfaces of the segment coils are coated with an insulating film; and
    the insulating films on the leading end portions of the segment coils are peeled off before the arms of the segment coils are bent in the circumferential direction of the stator core.

3. The stator manufacturing method according to claim 1, wherein the leading end portion is bent to an angle of 2-5 degrees.

4. A stator manufacturing method comprising:
    inserting a plurality of segment coils into a plurality of slots formed in a stator core;
    bending arms of the segment coils that protrude from the stator core, in a circumferential direction of the stator core;
    before or after bending the segment coils in the circumferential direction, directing parallel to each other leading end portions of the segment coils that are adjacent to each other in a radial direction of the stator core; and
    welding together the leading end portions of the segment coils with the leading end portions directed parallel to each other,
    wherein, before the arms of the segment coils are bent in the circumferential direction of the stator core, the leading end portion of one of the adjacent segment coils is sandwiched between a pair of positive mold and negative mold that have a bend of a predetermined angle and bent with respect to a root portion of the leading end portion at the predetermined angle, and after the arms of the segment coils are tilted in the circumferential direction of the stator core, the leading end portions of the adjacent segment coils are directed parallel to each other.

5. The stator manufacturing method according to claim 4, wherein:
    peripheral surfaces of the segment coils are coated with an insulating film;
    the insulating films on the leading end portions of the segment coils are peeled off before the arms of the segment coils are bent in the circumferential direction of the stator core; and
    the root portion is an end portion of a region coated with the insulating film.

\* \* \* \* \*